Dec. 6, 1955     W. J. MILLER     2,725,988
AUTOMOBILE TIRE SANDING DEVICE

Filed Oct. 16, 1950     3 Sheets-Sheet 1

Inventor
WALTER J. MILLER.
By Willard S. Groen
Attorney

Dec. 6, 1955 W. J. MILLER 2,725,988
AUTOMOBILE TIRE SANDING DEVICE
Filed Oct. 16, 1950 3 Sheets-Sheet 2
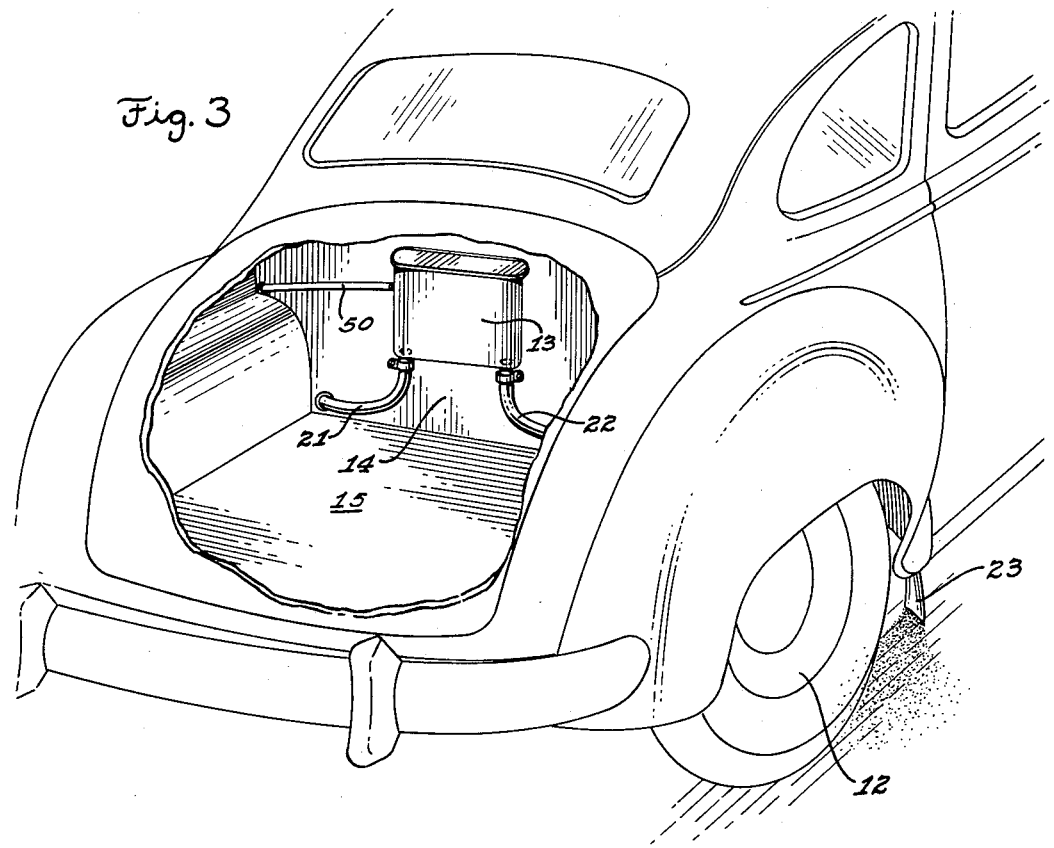
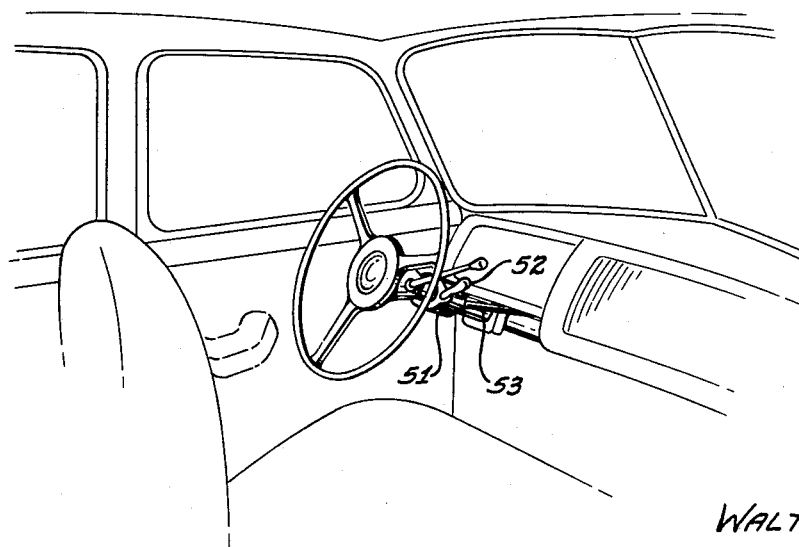
Inventor
WALTER J. MILLER.
By
Willard S. Groen
Attorney Dec. 6, 1955    W. J. MILLER    2,725,988
AUTOMOBILE TIRE SANDING DEVICE
Filed Oct. 16, 1950    3 Sheets-Sheet 3

Inventor
WALTER J. MILLER.
By Willard S. Greene
Attorney

United States Patent Office 2,725,988
Patented Dec. 6, 1955

2,725,988
AUTOMOBILE TIRE SANDING DEVICE

Walter J. Miller, Cactus, Ariz., assignor of fifty per cent to Fred Z. Stewart, Lakeville, Ind.; Grace Rhoda Miller, administratrix of the estate of said Walter J. Miller, deceased Application October 16, 1950, Serial No. 190,415

2 Claims. (Cl. 291—25)

This invention pertains to improvements in automobile tire sanding devices and is particularly directed to apparatus for applying abrasive materials under the driving wheels of motor vehicles to facilitate their movement on slippery and icy pavements.

One of the objects of this invention is to provide an attachment for applying abrasive materials under the driving tires of a motor vehicle which may be readily mounted on existing automobiles and which may be serviced and kept in high operating efficiency with a minimum of effort and alteration of the vehicle to which it is applied.

Another object of this invention is to provide a self contained unit for the abrasive materials and control valve mechanism which may be readily mounted in the luggage compartment of a motor vehicle.

Still another object of this invention is to provide an improved vacuum controlled sand dispensing valve for an automobile tire sanding device.

It is also an object of this invention to provide an electro-magnetically controlled vacuum operated dispensing valve for an automobile tire sanding device.

Further features and advantages of this invention will appear from a detailed description of the drawings in which:

Fig. 3 is a rear perspective view showing the installation of the sand supply box or hopper in the luggage compartment of the vehicle.

Fig. 4 is a view showing the control lever for operating the sanding device.

Figure 6:
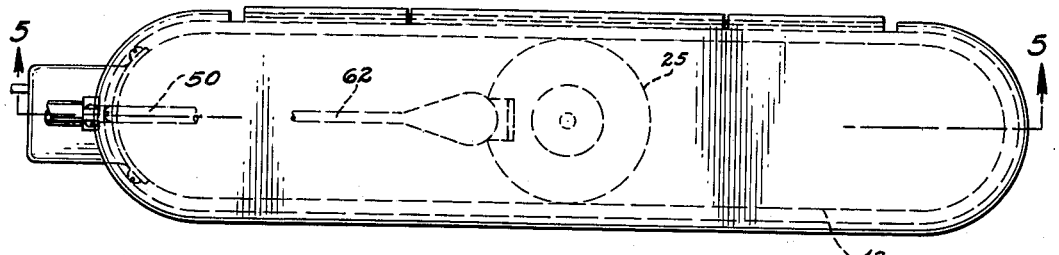
Fig. 6 is a plan view on the line 6—6 of Fig. 5.
Figure 5:
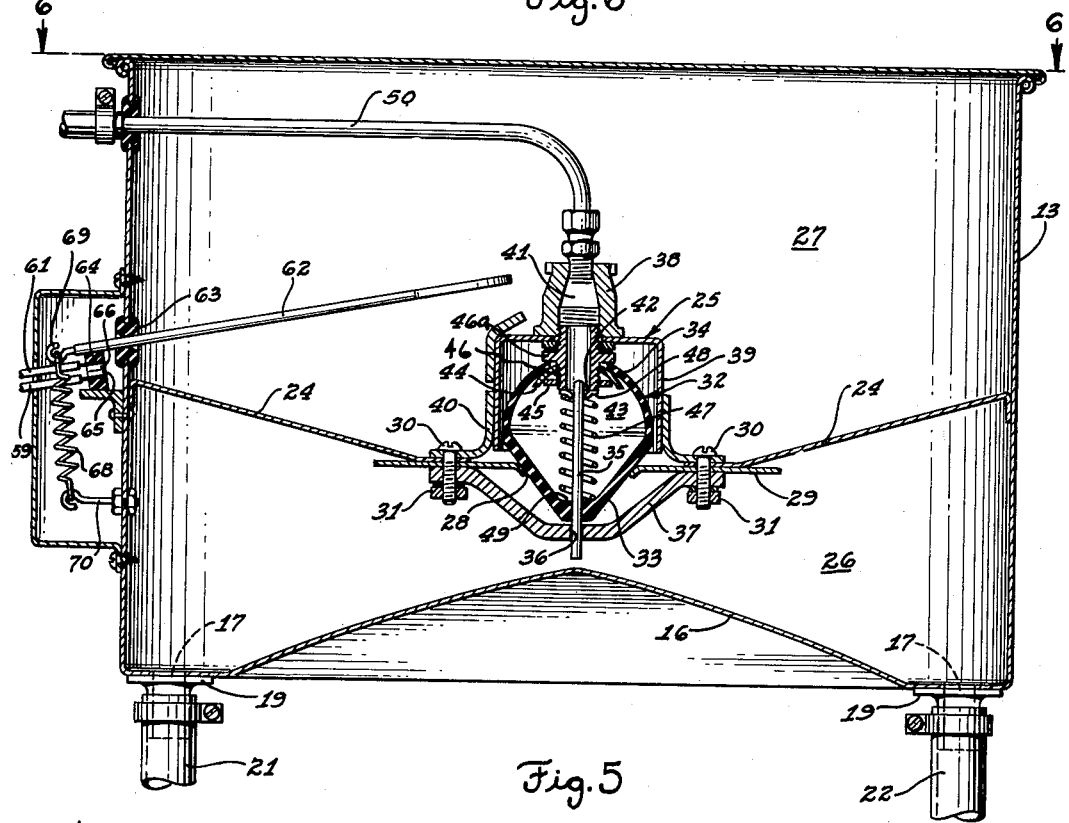
Fig. 5 is a vertical section through the sand supply box or hopper particularly showing the details of construction of the vacuum operated dispensing valve.

For exemplary purposes this invention is shown applied to a typical automotive vehicle comprising the main chassis frame 10 which is supported on the usual front wheels 11 and rear driving wheels 12. The device comprises essentially a sand dispensing box or hopper member 13 as best shown in detail in Figs. 5 and 6, which is suitably mounted behind the rear seat on the front wall 14 of the luggage compartment 15 of the motor vehicle as best seen in Fig. 3. The sand box comprises an elongated tank the bottom of which is provided with a convex baffle 16 with its ends extending downwardly and terminating in the openings 17 formed in the discharge bushings 19 which in turn are connected to the conveyor hoses 21 and 22. The hoses 21 and 22 in turn terminate at discharge nozzles 23, one located on each side of the vehicle and directly in front of the driving wheels 12.

Above the baffle 16 is a concave baffle 24 which contains the dispensing or discharge valve mechanism indicated generally at 25. There is thus formed the discharge chamber 26 between the baffles 16 and 24 and above the baffle 24 is the main supply compartment 27 in which is placed the sand or other abrasive materials to be dispensed to the driving wheels. In the baffle 24 there is provided a discharge opening 28 formed in a plate member 29 secured to the baffle 24 by suitable screws 30 and nuts 31. Adapted to engage in and close the valve opening 28 is the pneumatic valve ball 32 having a semi-rigid conical portion 33 and a hemispherical portion of flexible character at 34. The lower conical portion has fixed in it a guide pin 35 which slides in a guide bearing 36 in a supporting bracket 37 also secured to the baffle 24 by the screws 30.

The upper portion of the valve 25 comprises a fitting 38 which is securely rigidly mounted on the baffle 24 by means of a cup shaped member 39 which in turn is supported by suitable brackets 40 in turn secured to the baffle 24 by the screws 30. This fitting 38 has a suction chamber 41 which opens at 42 into the inner vacuum chamber 43 of the valve ball member 32. The upper flexible hemispherical portion 34 of the valve ball 32 is secured by a suitable concave washer 44 and a nut 45 carried on the threaded portion 46 of the nipple 46a held in the member 38 to hold the upper hemispherical portion 34 in airtight relationship to the member 38 and in communication with the chamber 41. A compression spring 47 surrounding the guide pin 35 engages against a washer 48 abutting against the bottom of the member 38 and the spring 47 abuts at its lower end against the inner surface 49 of the conical portion 33 of the valve ball 32 to hold the conical portion 33 in firm engagement with the valve seat 28 to prevent communication between the chamber 27 and the chamber 26 of the sand box.

Figure 1:
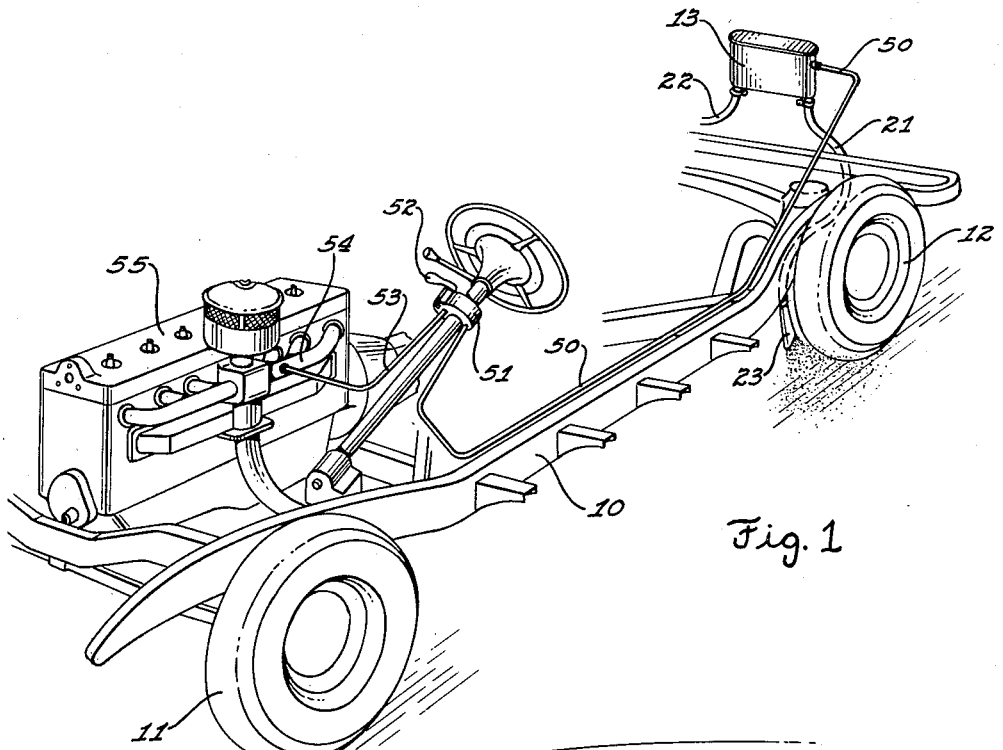
Fig. 1 is a fragmentary diagram showing an automobile chassis incorporating the features of this invention.
Figure 2:
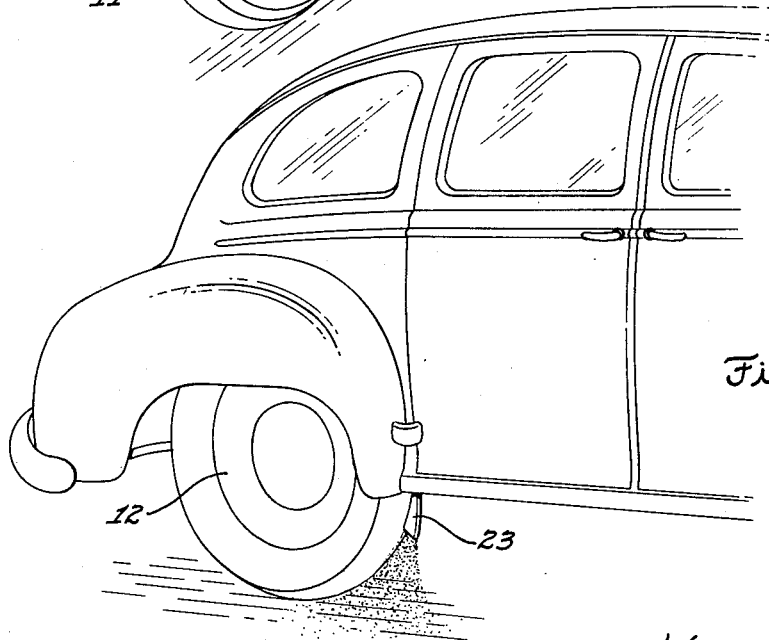
Fig. 2 is a right hand side perspective view of the vehicle showing the sanding apparatus in operation.

A suction line 50 is connected in communication with the chamber 41 in the member 38 and in turn is connected to a suitable shut-off valve 51, Fig. 1, which is operated by the control lever 52 conveniently located on the steering column as best seen in Figs. 1 and 4. A second line 53 is connected between the valve 51 and the intake manifold 54 of the internal combustion engine 55 of the vehicle.

Thus when the control lever 52 is operated to interconnect lines 53 and 50, suction vacuum is applied in the line 50 and the chamber 41 and in the vacuum chamber 43 of the valve ball 32 which causes the conical portion 33 of the valve ball to be drawn upwardly as the flexible hemispherical portion 34 ends under the vacuum pressure. This releases the conical portion 33 and the valve seat 28 to allow sand or abrasive material in the chamber 27 to feed downwardly into the chamber 26 and then down along the lower baffle 16 to the two discharge openings 17 and thus through the conveyor hoses 21 and 22 to the dispensing nozzles 23 in front of the rear driving wheels 12.

Figure 7:
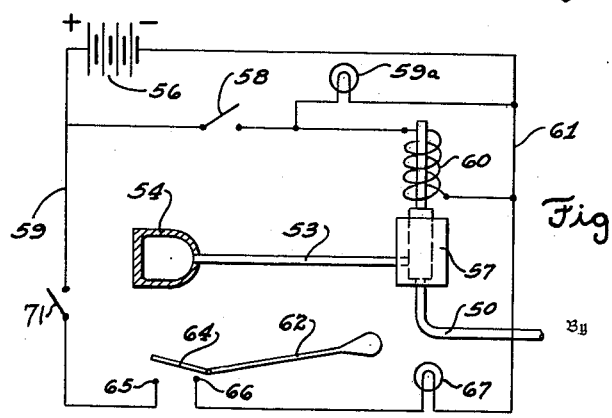
Fig. 7 is an electric diagram showing an electromagnetic arrangement for operating the vacuum control to sand dispensing valve shown in Figs. 5 and 6.

In Fig. 7 is shown an alternative electro-magnetic control arrangement for applying or disconnecting the vacuum from operation of the valve ball 32. In this arrangement the automobile battery 56 is utilized as a source of power to operate a solenoid actuated vacuum control valve 57 of a suitable and well known design. A control switch 58 is mounted, preferably on the steering column, to be actuated by the control lever 52 so that when the switch 58 is closed power from the line 59 is connected through the switch 58 and the solenoid coil 60 to the opposite line 61 to energize the solenoid coil 60 and open the valve 57 to interconnect vacuum lines 53 and 50 to actuate the valve ball 32 as described. Also at the same time that switch 58 is closed by the lever 52 an indicating light 59a, which is conveniently located to get the driver's attention, lights up indicating that sand is being applied to the rear wheels. When the switch 58 is again open to stop the sanding operation the light 59a is immediately extinguished. When the vacuum control valve 57 is directly mechanically operated by the lever 52 the switch 58 is also operated by this lever to control the light 59a through the circuit shown in Fig. 7, in which case the solenoid coil 60 is not used.

In order to give the driver a clue to the amount of material he has in the chamber 27 of the sand box 13 there is provided a sand level indicating switch having a paddle shaped switch arm 62 which is pivotally mounted by a suitable flexible rubber grommet 63 in the side of the casing 13. The arm member 62 projects outwardly and has a contact anvil 64 of suitable insulative material which is arranged to close the open contacts 65 and 66 to which are connected the leads 59 and 61 from the battery 56 which are connected in series with an indicating lamp 67 as best seen in Fig. 7. A tension spring 68 interconnected between the hooked end portion 69 of the lever 62 and a hook 70 fixed into the member 13 serves to hold the lever arm 62 in upward position. When sand is dumped into the chamber 27 the lever 62 is forced downwardly breaking the connection between 65 and 66 thus extinguishing the light 67. After the sand level in the chamber 27 has fallen to a predetermined level the lever arm 62 under the influence of the spring 68 flips upwardly to close the contacts and light the indicator light 67 which is also located conveniently for the driver to indicate that the sand needs replenishing in sand box 13. A disconnect switch 71 conveniently located for the driver in proximity to the control lever 52, serves to extinguish the warning light 67 when the device is not in use as during the summer period.

Having thus fully set forth and described this invention what is claimed as new and desired to be secured by United States Letters Patent is:

1. An automobile tire sanding device comprising, a sand hopper mounted behind the back seat in the luggage compartment of the vehicle, a single hollow discharge valve located in said hopper including a suction operated ball valve having an inverted conical valve seat engaging portion, a valve seat fixed in said hopper adapted to be engaged by said inverted conical valve seat engaging portion, a collapsible hemi-spherical suction portion formed above said conical portion, means for securing the top portion of said suction portion to said hopper, downwardly projecting guide pin means fixed in the apex of said conical portion, a guide bore in said hopper to receive said guide pin for vertical sliding movement, and resilient spring means inside of said ball valve yieldingly urging said conical portion toward said valve seat, means for actuating said valve by manifold vacuum comprising a connection between the hollow interior of said valve and the intake manifold of the internal combustion engine of said automobile, a control lever device on the steering column of said vehicle manipulatable to apply or disconnect vacuum relative to said operating valve, and conduit means from the bottom of said hopper connected to discharge nozzles opening in front of the rear driving wheels of said vehicle.

2. In an automobile tire sanding device having, a sand hopper box, a discharge means from said box to apply sand in front of the rear driving wheels of said vehicle, and a discharge control valve means in said sand hopper box including, a hollow suction operated ball valve having an inverted lower conical valve seat engaging portion, a valve seat fixed in said box adapted to be engaged by said inverted conical valve seat engaging portion, a flexible collapsible hemispherical portion formed integral with and located above the base of said inverted conical valve seat engaging portion, means for rigidly securing the apex of said hemispherical portion to said box, a guide pin fixed in the apex of said inverted conical valve seat engaging portion, a guide bearing fixed in said box to slidingly receive said guide pin to limit said conical portion to vertical movement, resilient compression spring means inside of said ball valve interacting between said box and the apex of said conical valve seat said spring surrounding said guide pin for normally holding said conical portion in engagement with said valve seat, and means for connecting vacuum suction to the hollow interior of said ball valve to cause said ball valve to move its conical portion vertically relative to said valve seat.

References Cited in the file of this patent

UNITED STATES PATENTS

| | | |
|---|---|---|
| 244,468 | McElroy | July 19, 1881 |
| 1,387,620 | Shailer | Aug. 16, 1921 |
| 1,812,521 | Elston | June 30, 1931 |
| 2,131,514 | Johnson et al. | Sept. 27, 1938 |
| 2,256,290 | McCune | Sept. 16, 1941 |
| 2,391,605 | Walton | Dec. 25, 1945 |